United States Patent [19]

Reichl

[11] 3,941,425
[45] Mar. 2, 1976

[54] MOBILE SLURRY HANDLING SYSTEM
[75] Inventor: Eric H. Reichl, Pittsburgh, Pa.
[73] Assignee: Consolidation Coal Company, Pittsburgh, Pa.
[22] Filed: Nov. 4, 1974
[21] Appl. No.: 520,685

Related U.S. Application Data
[63] Continuation of Ser. No. 389,273, Aug. 21, 1973, abandoned, which is a continuation-in-part of Ser. No. 294,720, Oct. 3, 1972, abandoned.

[52] U.S. Cl. ............. 302/14; 137/344; 137/355.17; 191/12 R; 302/64
[51] Int. Cl.² ......................................... B65G 53/54
[58] Field of Search ............................... 302/14–16, 302/64; 137/344, 355.16, 355.17; 299/18, 19, 64; 191/12 R; 193/25 E; 239/189, 211, 212; 74/246

[56] References Cited
UNITED STATES PATENTS

| | | | |
|---|---|---|---|
| 3,260,548 | 7/1966 | Reichl | 299/18 |
| 3,301,599 | 1/1967 | Heimaster | 299/57 |
| 3,362,752 | 1/1968 | Densmore | 137/344 |
| 3,602,551 | 8/1971 | Velegol | 302/14 |

Primary Examiner—John J. Love
Assistant Examiner—Jeffrey V. Nase
Attorney, Agent, or Firm—William J. Miller

[57] ABSTRACT

An apparatus for handling and transporting a product such as coal as a slurry in a mine. The apparatus is used in combination with a digging machine which also has included therewith means for conveying the coal or material released by the digging machine to a hopper for mixing water thereto to form a slurry, and a terminal for taking a slurry to the surface of the mine. The apparatus includes a dual flexible hose system interconnecting the terminal with the slurry hopper. A plurality of carts are spaced along the hose system to support the hose off of the mine floor and to provide mobility to the hose. The system further contemplates a means for storing a long length of hose and a means for activating the support carts to move only that portion of the hose which is not in storage. The carts will follow the movements of the coal digging machine into and out of the room where the coal is being removed. Further features include means for removing the hose system from storage and for making turns in the mine passages.

9 Claims, 29 Drawing Figures

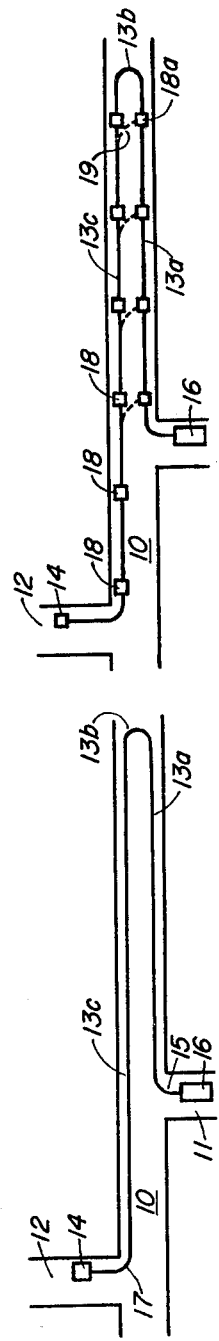
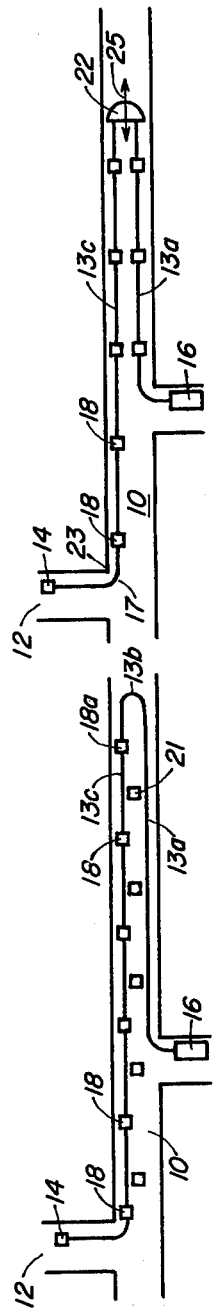
FIG. 1(a)
FIG. 1(b)
FIG. 1(c)
FIG. 1(d)

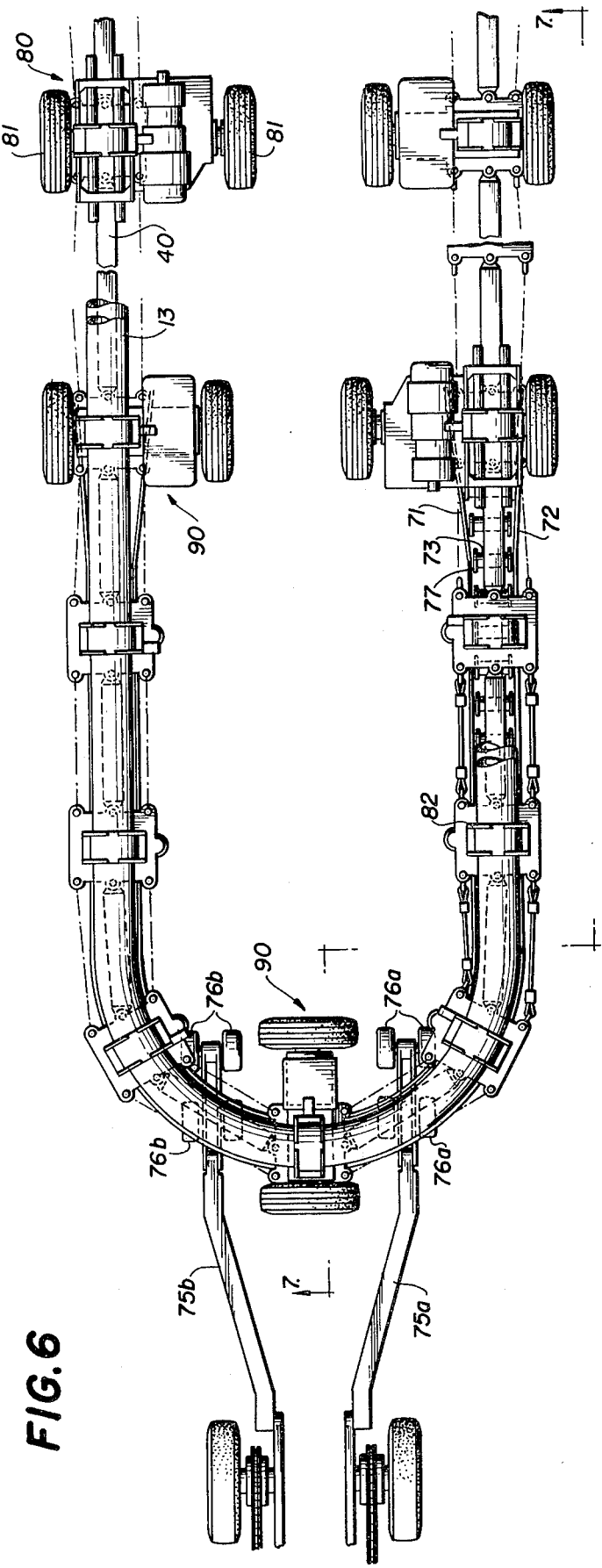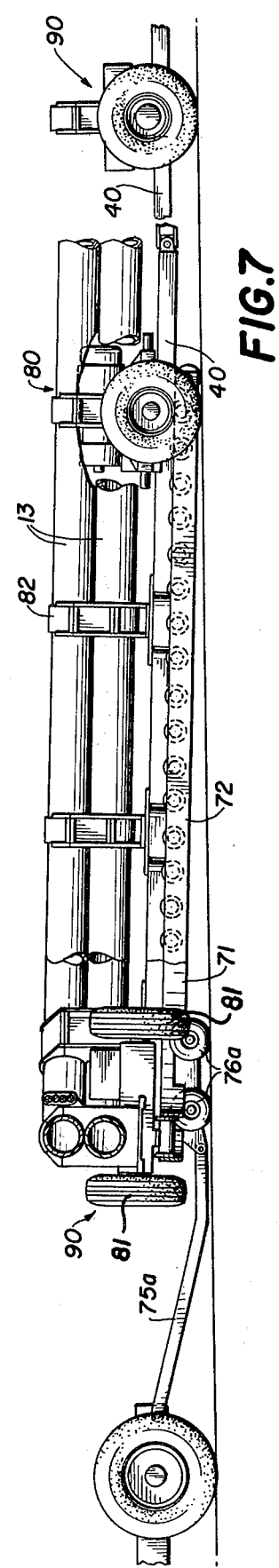
FIG.6
FIG.7

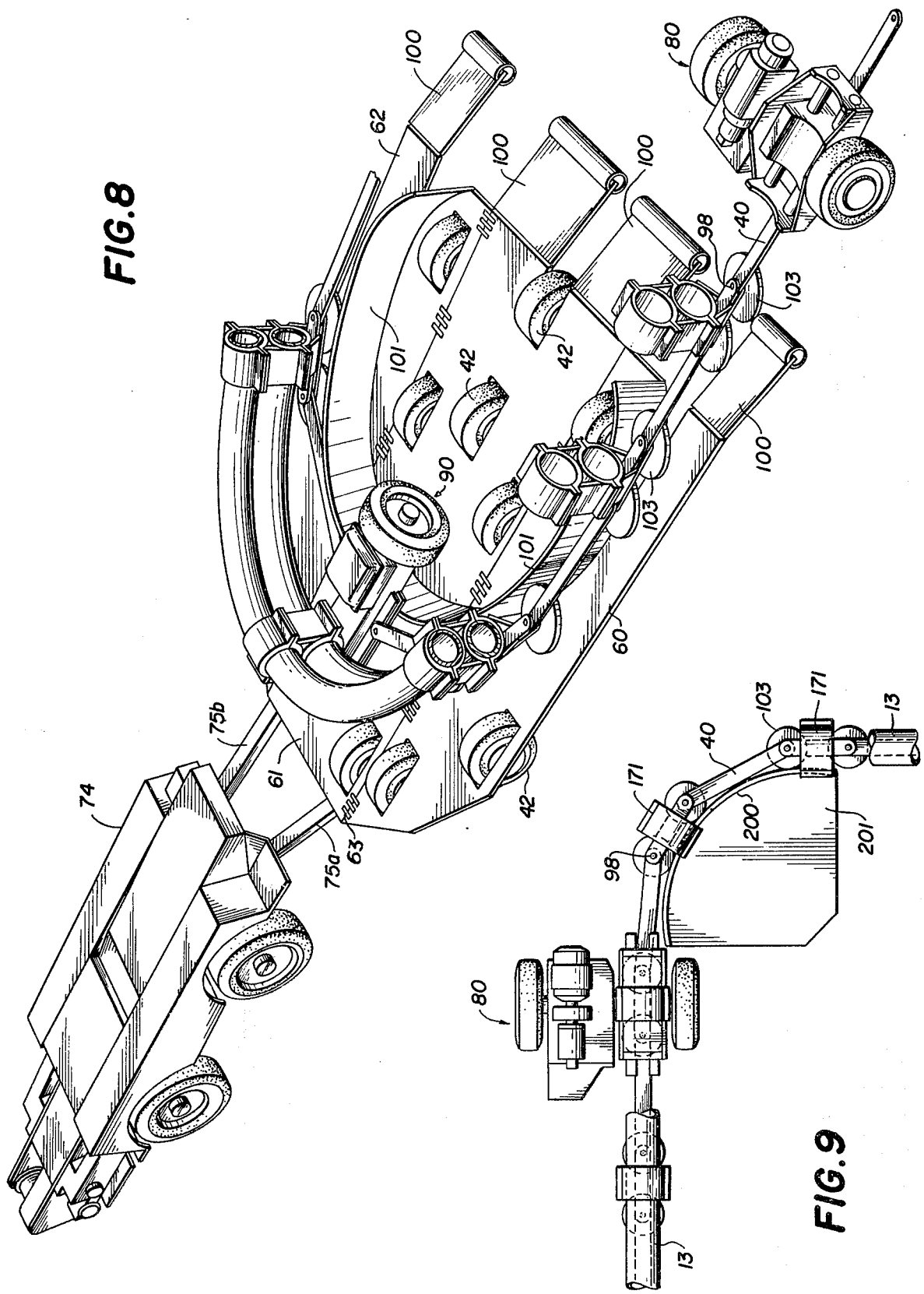

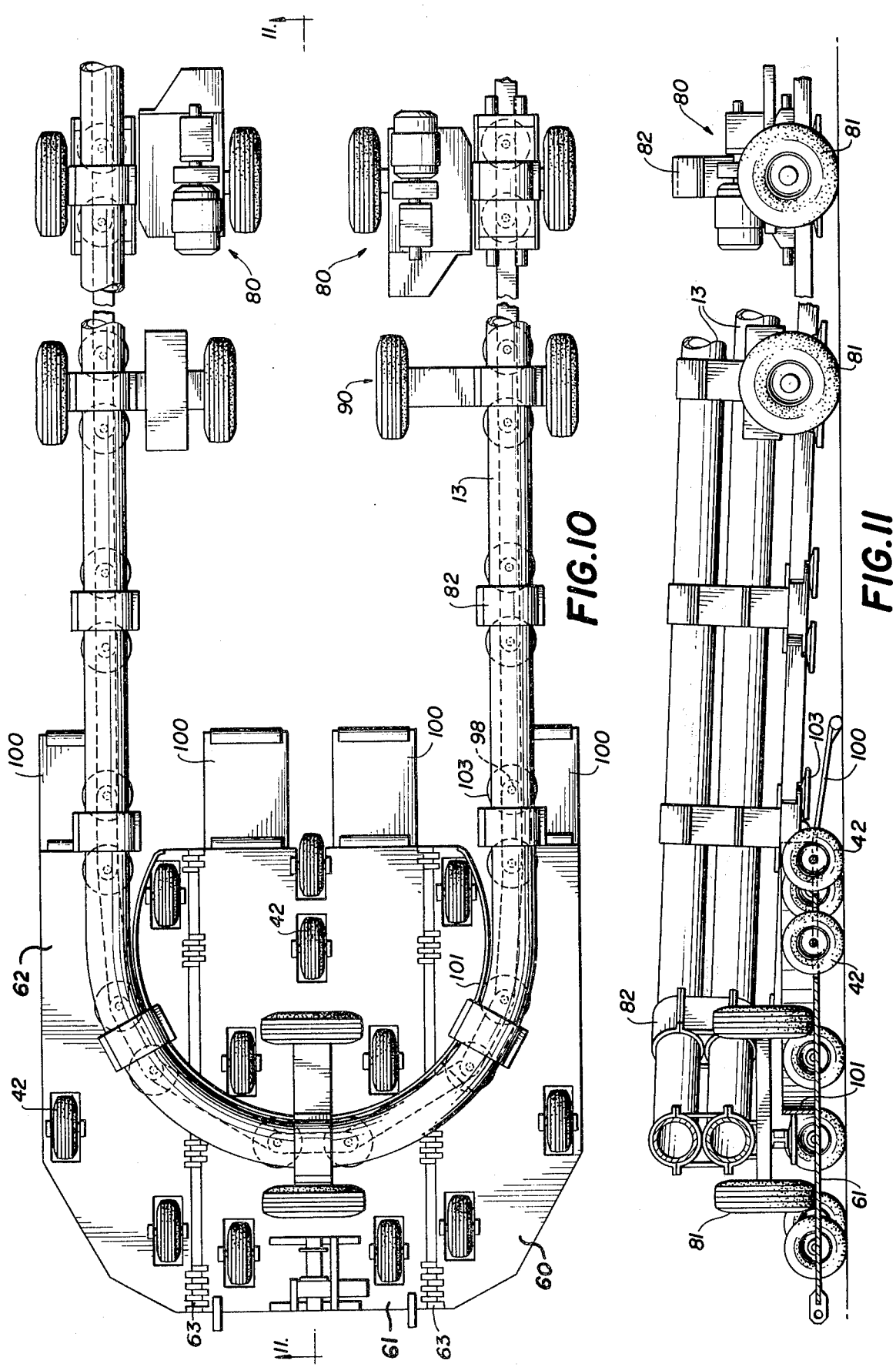

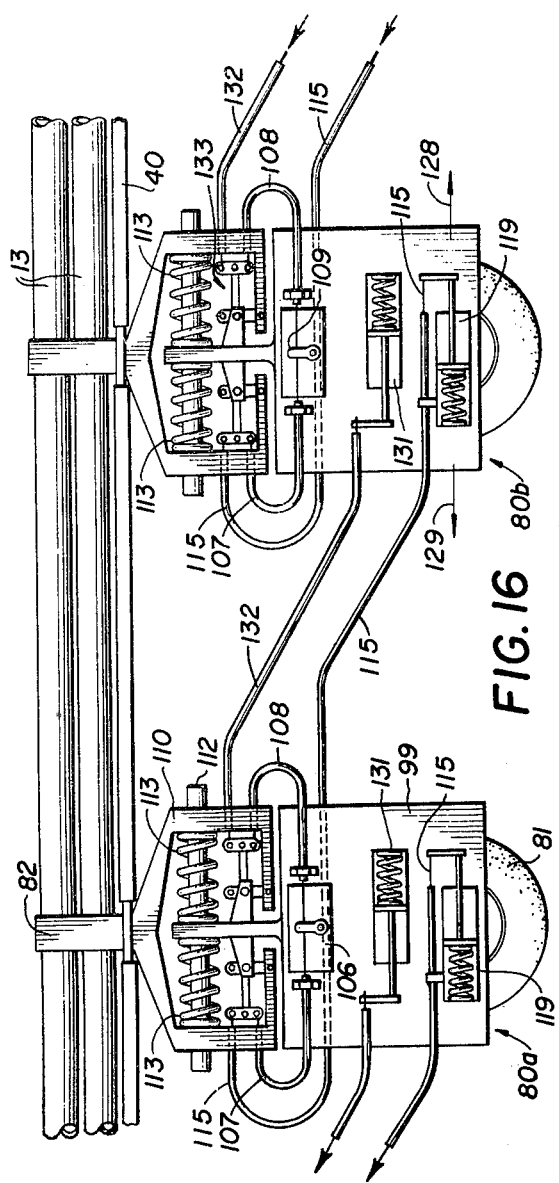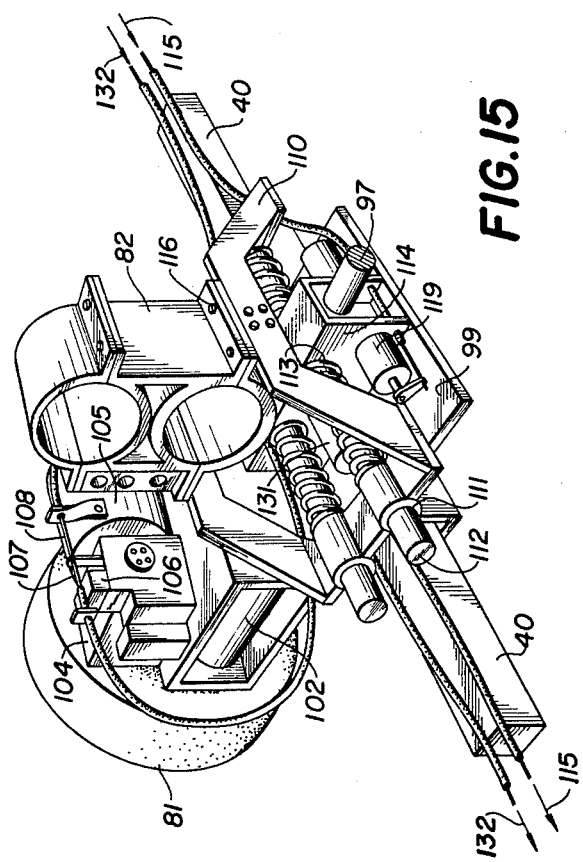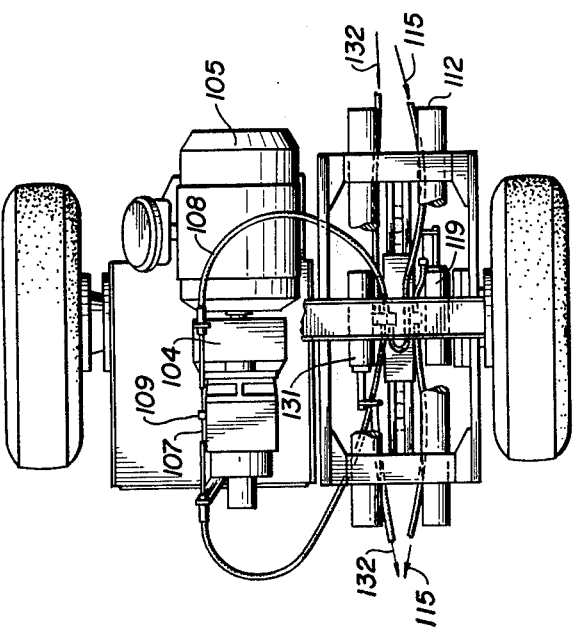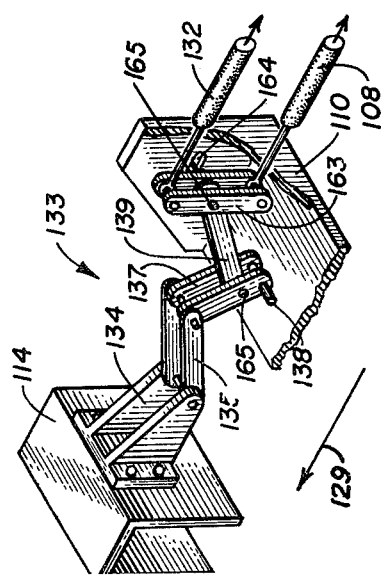

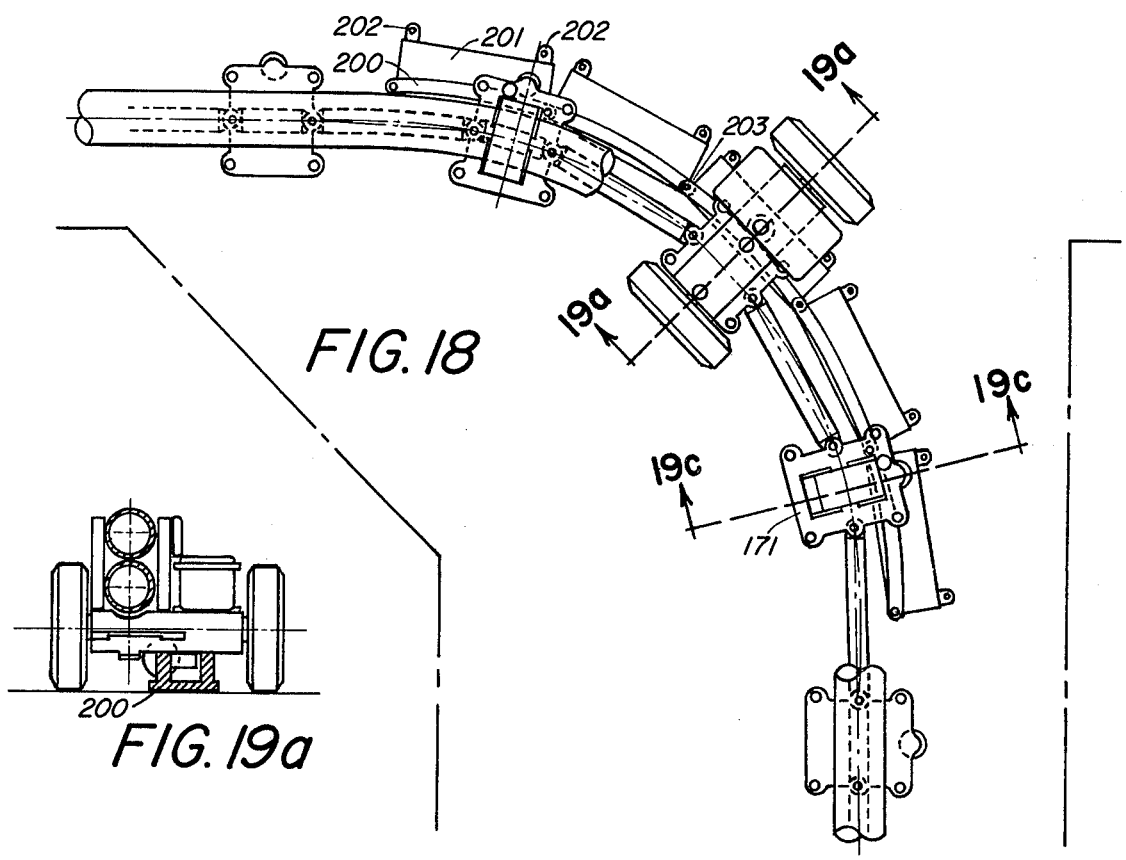
FIG. 18
FIG. 19a
FIG. 19b
FIG. 19c
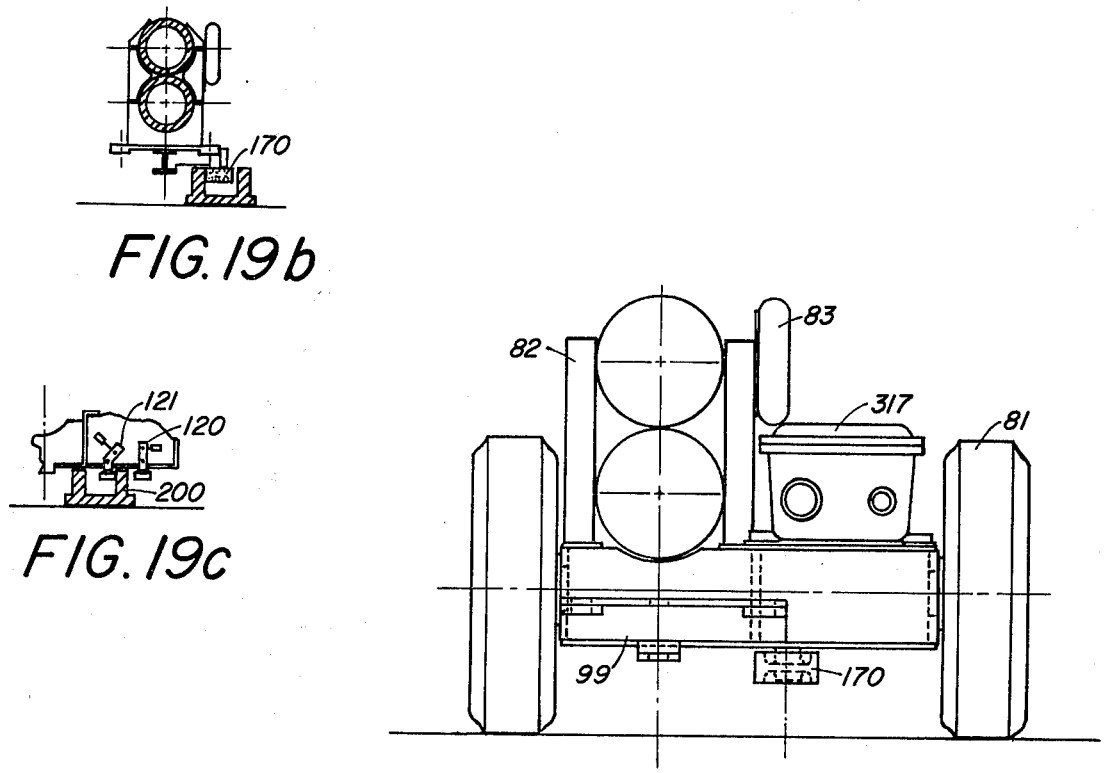
FIG. 17

MOBILE SLURRY HANDLING SYSTEM

CROSS-REFERENCE TO RELATED APPLICATIONS

This application is a continuation of Ser. No. 389,273 filed Aug. 21, 1973, now abandoned, and was a continuation-in-part of Ser. No. 294,720 filed Oct. 3, 1972, now abandoned. Related subject matter is disclosed in U.S. Pat. No. 3,868,964 entitled "Conveyor for Slurry Hose Transportation System"; U.S. Pat. No. 3,886,965 entitled "Linkage Geometry for a Slurry System"; U.S. Pat. No. 3,830,325 entitled "Vehicle and Vehicle Control System"; U.S. Pat. No. 3,827,454 entitled "Vehicle and Vehicle Control System"; and U.S. Pat. No. 3,845,990 entitled "Slurry Hopper System."

BASIC DESCRIPTION OF THE INVENTION

This invention relates to a combination of apparatus for handling a flexible slurry hose system which is connected between a terminal and a coal digging machine. The slurry hose system includes two hoses, one for transporting water or other fluid, and the second for transporting the slurry which consists of the mined material and the fluid mixed together. Transportation of the hoses is provided by a plurality of carts spaced along the pair of hoses and not only supports the hoses off of the floor of the mine, but also provides mobility to the hoses along the axes thereof.

The carts are selectively controlled so that the pair of hoses will follow all movements of the coal digging machine into and out of the room where the coal is being dug. A certain portion of the total length of the pair of hoses is positioned in the mine to provide storage so that the coal digging machine can operate for an extended period of time without requiring the movement of fixed pipes from the terminal to the beginning of the slurry hose system.

DISCUSSION OF THE PRIOR ART

The best prior art relating to the above system is found in U.S. Pat. No. 3,260,548, entitled "Method and Apparatus for Continuously Mining and Transporting Coal" by E. H. Reichl. In the patent a coal digging machine is connected to a terminal through a pair of flexible pipes. These flexible pipes are nonsupported but have a slightly greater length than they need to go from the termination of fixed pipes to the coal digging machine. Thus some storage is provided by the excessive length of the pipes. The invention thus disclosed, however, does not take into consideration the excessive wear which will result from pipes or hoses which are made principally of steel reinforced rubber. These hoses may weigh as much as 100 pounds per foot when full, and movement of a hose of this weight over the rough surface of a mine passage floor will result in early failure of the hose. Furthermore, when the mining machine makes a 90° turn, there is noway to successfully move the hose around the turn.

Most mines in the past have incorporated the use of conveyers of one form or another to handle the large quantity of coal being produced by the automatic digging machine. Many attempts have been made to interconnect these conveyers in an effort to form a continuous movement of coal from the coal digging machine to a centralized conveyer system. Such a system is shown in the patent to Heimaster, U.S. Pat. No. 3,301,599, and the patent to Cartlidge, U.S. Pat. No. 2,674,364.

These conveyer systems, however, have not proved very satisfactory, since no suitable method has been devised for storing a conveyer so that as the coal digging machine progresses into the room being mined the conveyer cannot follow the machine. While efforts have been made to solve the problem of conveyer storage, such as yet remains generally unsatisfactory.

The patent to Densmore, U.S. Pat. No. 3,362,754, conceives the use of a pipe supported by wheels which could conceivably follow a coal digging machine to a small extent. This patent discloses the concept of using one or more telescoping tubes. The patent did not conceive, however, of a method whereby the coal digging machine could progress for extended periods of time into one or more rooms without requiring the changing or reorganizing of the coal removal apparatus.

BRIEF DESCRIPTION OF THE ADVANTAGES

The invention disclosed herein provides a means for continuously removing coal at a high rate from a coal digging machine and transporting the product to a terminal capable of disposing of the removed product. The apparatus can follow the continuous movements of a coal digging machine, whether the machine is moving inwardly or outwardly in the room being dug, or whether it is moving out of the room and into another room including the making of one or more 90° turns in order to arrive at the room where the coal is next to be removed.

BRIEF DESCRIPTION OF THE FIGURES

FIGS. 1a through 1d disclose various methods for storing and mobilizing the slurry hose hauling system;

FIG. 6 is the top view of the 180° conveyer shown in FIG. 5;

FIG. 7 is a side view, partly in section, of the 180° conveyer taken through lines 7—7 in FIG. 6;

FIG. 8 is the preferred 180° conveyer shown in perspective view;

FIG. 9 illustrates a 90° turn for the hose hauling system shown in FIG. 8;

FIG. 10 is a top view of the 180° conveyer shown in FIG. 8;

FIG. 11 is a sectional view taken through lines 11—11 of FIG. 10;

FIG. 14 is a top view of the powered cart shown in FIG. 13;

FIG. 15 is a perspective view of the powered cart shown in FIGS. 13 and 14;

FIG. 16 is a schematic representation of the control cables for maintaining speed control between the various carts;

FIG. 16a is a perspective view of the linkage mechanism used in the speed control system illustrated in FIG. 16;

FIG. 17 is an end view of an unpowered cart;

FIG. 18 illustrates one method for controlling the carts during a 90° turn;

FIGS. 19a and 19b illustrate the method for controlling an unpowered cart in a 90° turn;

FIG. 19c illustrates the method of controlling a powered cart during a 90° turn;

GENERAL DESCRIPTION OF THE INVENTION

Figure 3:
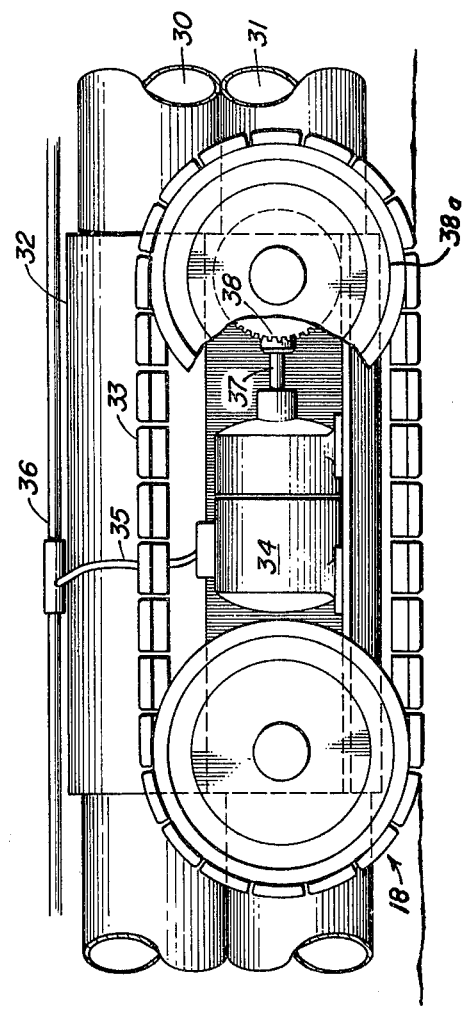
FIG. 3 is a side view of the apparatus shown in FIG. 2.

Unless otherwise noted, the same numbers will be used throughout the specification for the same or similar parts.

A general description of the invention is best understood by referring to FIGS. 1a through 1d which illustrate a portion of a typical mine layout where a passage 10 is intersected by a second passage 11 and a room 12. Along passage 10 is a pair of slurry hoses comprising a storage section 13a, a 180° turn 13b, and an active section 13c which is connected to a product and slurry handling system (not shown) which is attached to mining machine 14. The remaining end 15 is coupled to terminal 16, such as a fixed pipe system or pump system. The system as described in FIGS. 1a through 1d comprises essentially four different concepts for connecting a slurry hose from the pumping system 16 to the mining machine 14. For simplicity of description room 12 is illustrated as intersecting passage 10; however, room 12 can be several passages away from passage 10 and at some other angle than 90°, depending upon the particular mining plan used.

In FIG. 1a the hose is laid out along passage 10 in a storage section 13a; formed into a 180° turn at 13b; back along passage 10 at 13c, around a 90° curve 17 and into room 12 where it is connected to the mining machine 14. In this concept any movement of the mining machine 14 will require physical movement of the hoses around 90° turn 17, active section 13c, and 180° turn 13b. Since the hose is extremely heavy and easily damaged, a method which would support the hose is preferable to any method for physically moving the hose along the passage floor as suggested in FIG. 1a. One method for supporting the hose is shown in FIG. 1b where carts 18 are attached to hose portions 13a, 13b, and 13c along their length and in sufficient numbers to prevent the hose from dragging on the floor of passage 10. As the mining machine 14 moves into passage 10, section 13a, which functions as a storage, must get shorter. As section 13a gets progressively shorter, at least one cart 18a must move from the rest position to an active position along the hose section 13c. In order to perform this task the cart must move along a line illustrated by dotted line 19.

Referring to FIG. 1c another possibility is illustrated. Thus as carts 18 in the active section 13c of the hose move as a consequence of mining machine 14 moving progressively deeper into room 12, loop 13b will move toward room 12. Eventually cart 18a will move past an idle cart 21 positioned in the passage 10. As soon as a portion of hose section 13c substantially equal to the distance between carts 18 and 18a has passed cart 21, cart 21 will be attached to the hose and function as an active cart. Naturally, if mining machine 14 reverses and moves out of room 12, when cart 21 reaches the stationary location as shown in FIG. 1c, it will be detached.

The systems illustrated in FIGS. 1a, 1b, and 1c all have certain limitations. The system as shown in FIG. 1a provides no protection or support for the hose. If the hose is heavy, the mining machine must have an exorbitant amount of horsepower in order to pull the hose. Furthermore, the handling of the hose becomes a nearly impossible task, since the hoses may weigh as much as 100 pounds per foot and the length of the total hose may be as long as 1,000 feet.

FIG. 1b requires that cart 18a travel a rather difficult path along direction 19 which may overstress the hose, causing damage or failure.

The system as shown in FIG. 1c presents a serious problem when cart 21 must be connected to the hoses. The physical lifting of the hoses will require cranes or jacks. Furthermore, the hose is physically dragged for a distance until cart 21 is connected and furthermore is dragged an additional distance after it is disconnected, thus increasing the wear and possible failure of the hose system.

The preferred embodiment is shown in FIG. 1d. In this embodiment the hose is supported along its entire length by carts 18. A 180° conveyer 22 provides a means for rotating the carts from the storage section 13a and to the active section 13c without causing loss of support to the hose system, thereby preventing excessive wear on the hoses. The system also contemplates some form of guide at the 90° turn 17 to further protect the hose from damage resulting in the corner 23 cutting into the hose. The conveyer 22 will move forward or backward in the direction of the arrow 25 to accommodate the increase or decrease in the length of the storage section 13a of the hoses.

Figure 2:
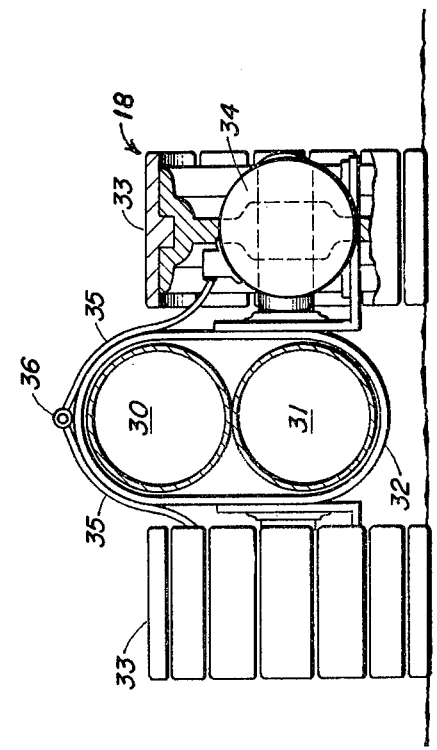
FIG. 2 is a front view of a vehicle used to transport a pair of hoses.

A cart 18 suitable for supporting the hoses is illustrated in FIGS. 2 and 3. Hoses 30 and 31 are mounted, one above the other, and secured by a bracket or clamp 32. A tractor comprising a pair of treads 33 is driven by an electric motor 34 which is connected through a cable 35 to a central power and control cable 36. Electric motor 34 may be connected in any usual means to the treads 33 such as a shaft 37 and gears 38 to drive wheel 38a. Each of the treads will have its individual motor 34, and each of the motors 34 can individually cause its respective tread 33 to rotate clockwise or counterclockwise.

Figure 4:
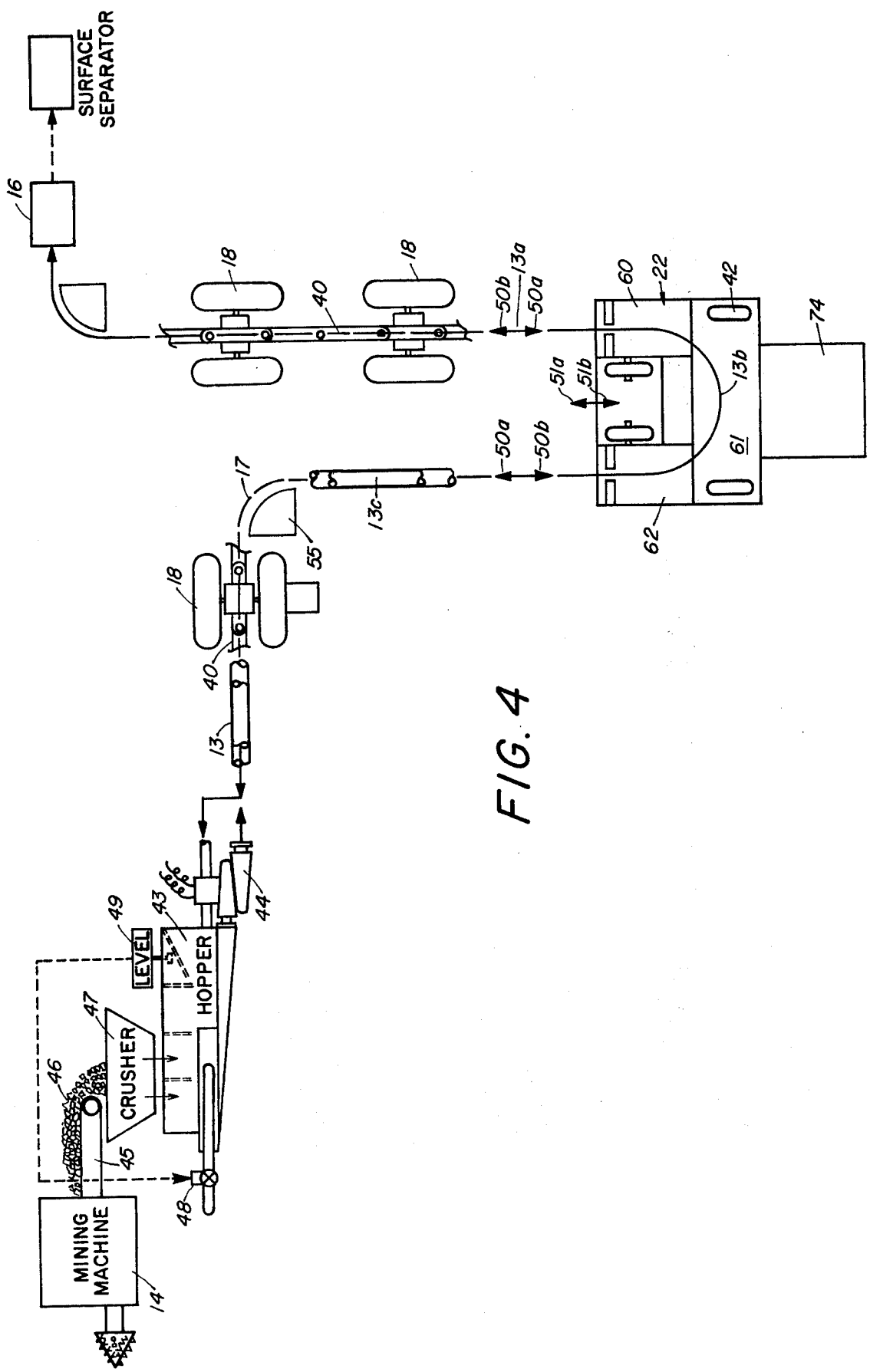
FIG. 4 is a schematic layout of the hose hauling system and its interconnection with the digging machine.

FIG. 4 provides a more detailed version of the apparatus illustrated in FIG. 1d. In addition to those elements shown in FIG. 1d, FIG. 4 includes a linkage means 40 interconnecting each of the carts 18. The linkage means will be more particularly described in a subsequent portion of this specification. The 180° conveyer 22, which will also be more particularly described in a subsequent portion of this specification, essentially comprises a platform having a center portion 61 and two side portions 60 and 62. A plurality of wheels 42 is rotatably attached thereto. A tractor 74 provides mobility to the conveyer. The conveyer is designed to pick up the carts 18 and move them about the 180° turn 13b to the active section 13c. At the termination of the hose system one hose is connected to a hopper 43, the other to a slurry pump 44. The mining machine 14 includes a conveyer 45 which conveys the mined product 46 over a sizing crusher 47. Crusher 47 deposits its output into hopper 43. Water is applied through a remotely controlled valve 48 to hopper 43. A water level control 49 is electrically connected to valve 48.

OPERATION

The operation of the system described in FIGS. 1 through 4 is as follows:

As the mining machine 14 removes a product, such as coal, the product 46 is picked up by conveyer 45 and transferred to crusher 47. Crushers are well known in the art and may comprise several varities, such as two- or three-jaw crushers, rotary crushers, and the like. The crusher system may also include a small particle separator so that the particles already of proper size are passed through to the hopper and only those particles which are oversized are actually crushed. The water level control 49 maintains the level of water in the hopper 43 at a predetermined height, regardless of the amount of coal passing from crusher 47 into the hopper. One of the pair of hoses 30 or 31 (see FIGS. 2 or 3) contains the water while the remaining hose contains a fluid product mixture generally referred to as a slurry. The latter hose is connected to the output of slurry pump 44 which removes the product and water from hopper 43 and pumps it down the hose as slurry, until it reaches terminal 16 which, as previously stated, can comprise an additional length of fixed line and a lift pump, if necessary, to remove the product to the surface. As mining machine 14 moves into a new seam of coal, the hopper 43, crusher 47, pump 44, and pipes 30 and 31 along with carts 18 must respond to this movement. The response is carried out by tension being transferred along linkage 40 to each of the carts on the active section 13c of the slurry system. The control system will be completely described in a subsequent portion of this specification. As the active section moves in the direction of arrow 50a, the storage section 13a must become shorter, therefore, conveyer 22 must move in the direction of arrow 51a. When a cart 18 reaches the conveyer, the cart will travel up ramp 60, around ramp 61, to ramp 62. If mining machine 14 should back out of the room, the control system along linkage 40 will reverse, causing the previously mentioned cart 18 to move in the direction of 50b. Since the active section 13a will then be moving in the direction of 50b, it will require an increase in the storage section 13a. To accomplish this movement, conveyer 22 must move in the direction of arrow 51b. Tractor 74 will provide the mobility for the conveyer by pushing or pulling the conveyer.

90° conveyer 55 provides a guide for the carts and linkage system around the 90° turn, thus protecting the slurry hoses 30 and 31 from damage due to either dragging on the floor of the mine passage or cutting into a corner 23 (see FIG. 1d) at the intersection of two passages or a passage and a room.

The system as above described was illustrated with caterpillar-type carts as illustrated in FIGS. 2 and 3; however, the carts used in the preferred embodiment utilize wheels as will be described in a subsequent portion of this specification.

180° Conveyer

Two embodiments of a 180° conveyer system as illustrated in FIG. 4 are described by referring to FIGS. 5 through 11. Referring first to the embodiment shown in FIGS. 5 through 7, a conveyer 70 is formed in a 180° configuration and has side panels 71 and 72. A plurality of conveyer rollers 73 are rotatably journaled between side panels 71 and 72. Tractor 74, which may be an electrically driven tractor suitable for use in mines, has a pair of arms 75a and 75b attached at one end to the tractor and connected at the remaining end to a pair of rollers 76a and 76b. Side panels 71 and 72 are attached to arms 75a and 75b. A disc 77 is attached to each end of each conveyer roller 73. A small roller 76c is journaled between panels 71 and 72 and supports each end of the conveyer. The panels 71 72, and hence the rollers 73, are raised in their central portions adjacent the tractor 74 and extend downwardly therefrom toward the end rollers 76c.

Figure 5:
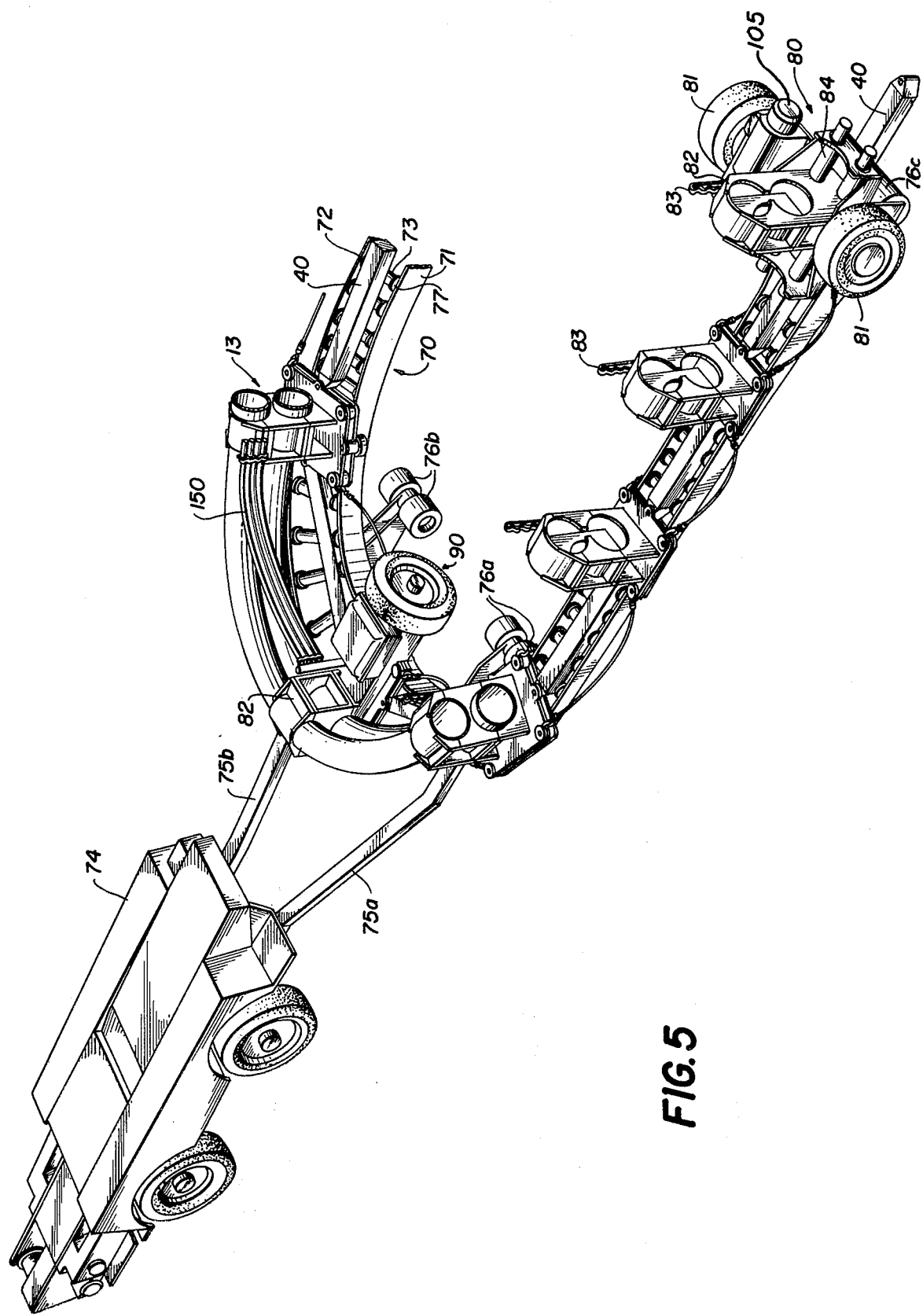
FIG. 5 is a perspective view showing one version of a 180° conveyer.

The system for hauling the hoses when using the conveyer 70 includes both powered and unpowered carts. Each power driven cart 80 comprises a pair of wheels 81, a hose clamp 82, an electric cable clamp 83, and a motor 105 which may be electric and operates a hydraulic pump which drives hydraulic motors (not shown) which are coupled to each wheel 81. Each unpowered cart, generally referred to by number 90, differs from the powered vehicle in that it does not contain a motor coupled to the wheels but does contain clamp 82 suitable for rigidly holding slurry hoses generally referred to as 13. The operation of the conveyer illustrated in FIGS. 5 through 7, is as follows:

As the conveyer 70 is moved in either direction by the tractor 74, the linkage 40 rolls along the rollers 73 between the discs 77 to guide the hoses and carts through a 180° turn. Also, the rollers 73 are elevated sufficiently in the central portion of the conveyer that the wheels 81 of the various carts will be raised off of the mine floor as illustrated in FIG. 7, thus facilitating the turning of the carts through 180°.

In the preferred embodiment, the linkage is designed, and such design will be fully described in a subsequent portion of the specification, so that the length of the linkage, whether lying straight or whether lying in a 180° turn, will always have the same length as the axes of the slurry hoses 13. The design will thus prevent the preferred slurry hoses from buckling because the linkage is too long or too short when it passes around the 180° turn. Tractor 74 provides mobility to the conveyer by virtue of the wheels 76a and 76b and rollers 76c. As previously described, the mobility will provide the conveyer with forward and backward movement in accordance with the length of the slurry line being utilized at the moment.

The preferred embodiment of the conveyer is illustrated in FIGS. 8, 10, and 11 and essentially comprises a first side platform 60, a center platform 61, and a second side platform 62. Attaching means 63 connect the platforms to make a unitary structure. Spring biased ramps 100 are connected to the various platforms 60, 61, and 62 and provide a method for easing the carts 18 into the platform. An arcuate side panel 101 is attached normal to the surface of each of the platforms 60, 61 and 62 and functions as a guide rail for the slurry system. Wheels 42 support the conveyer off of the passage floor and provide mobility to the conveyer. A tractor 74 is connected through arms 75a and 75b to platform 61.

Linkage 40 has attached to each pivot point a disc 103 which is journaled through pin 98. The geometry of the linkage in this embodiment is the same as the design of then linkage in the previous embodiment described in FIGS. 5 through 7 and will be described in detail in a subsequent portion of this specification.

The operation of this embodiment is as follows:

Carts 80, whether powered or unpowered, depending upon their direction of movement, will pass up spring biased ramps 100 onto platforms 60 and 61 or 62 and 61. As each disc 103 hits guide 101, the disc 103 will act as a roller, controlling the position of linkage 40 as it passes around the conveyer.

The powered carts are servo-controlled in a manner to be described so that the linkage will always be under tension and never under comprssion; therefore, regardless of the direction of movement of the slurry hose system, the linkage 40 will either be in a neutral or tension condition.

The specific constructions disclosed in the 180° conveyers described in FIGS. 5 through 11 are not my invention and are the subject matter of copending application entitled "Conveyer for Slurry Hose Transportation System," previously identified.

LINKAGE GEOMETRY

In the preferred embodiment of this invention the hose for either the slurry or the water is approximately 1 foot in diameter, measured across the outside of the hose. The hose is made of rubber reinforced with steel. The steel prevents collapse of the hose in case a vacuum should be pulled on the system accidentally.

One of the more important restrictions on the operation of the hose hauler vehicle system using the preferred hose referred to above is that during a turn the one-foot diameter hose must not be bent into a radius less than five feet measured to the outside of the hose. The bending raidus is dictated by the structure of the hose and can be modified for any available hose. The approach chosen to insure that this restriction is not violated is to mount the hose 30 or 31 on a linkage 40 which will mechanically restrain the hose from bending into a radius less than the forbidden value. The linkage also serves to support the hose between carts preventing it from dragging on the coal mine floor.

Figure 12:
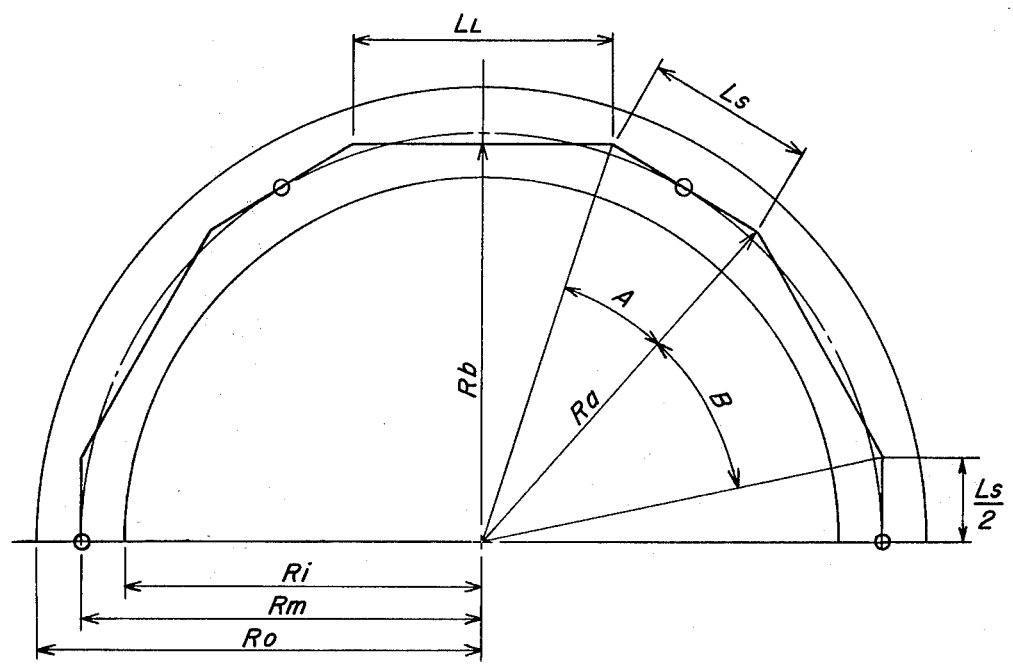
FIG. 12 is a mathematical representation used to calculate the linkage geometry used to interconnect the vehicles of this invention.

The linkage geometry in the preferred embodiment is such that the linkage length and the hose length are equal when both are bent into a turn. The critical case is the 180° turn. The convenient linkage geometry to restrain the hose in the desired radius on the 180° turn is based on a semidodecagon as illustrated in FIG. 12. Since the outside radius $R_o$ of the hose bend is 5 feet (maximum bend permitted for the hose) and the outside diameter $D_o$ of the hose is 1 foot, then the inside radius $R_i$ is four feet and the mean radius $R_m$ of the bend is 4.5 feet. A length of hose in a 180° bend is then $\pi R_m = 14.14$ feet.

From FIG. 12 the geometry is set up so that the linkage 40 is made up of a combination of short links ($L_s$) and long links ($L_1$) calculated so that the centers of the short links always coincide with the center line of the hose and so that the total linkage length is always equal to the total links of the hose. Further, the hose is always clamped to the shortest links.

Referring to FIG. 12, the following equations can be written:

$$3 L_1 + 3 L_s = \pi R_m \qquad (1)$$

$$A + B = \pi/3 \qquad (2)$$

$$\frac{L_s}{2 R_m} = \tan \frac{A}{2} \qquad (3)$$

$$\frac{L_s}{2 R_a} = \sin \frac{A}{2} \qquad (4)$$

$$\frac{L_1}{2 R_a} = \sin \frac{B}{2} \qquad (5)$$

With $R_m = 4.5$ feet, equations (1) through (5) may be solved by using appropriate trigonometric identities to obtain $L_s = 1.585$ feet and $L_1 = 3.127$ feet.

Each cart, either powered or unpowered, must occupy a short link to minimize lateral movement of the hoses as they are moved through a 180° turn.

The preferred 1 foot diameter hose is manufactured in lengths no greater than 50 feet. Since the end connections are a significant component of hose cost, it is desired that the length of individual hose segments be as long as other restraints allow. The hose connections are made with 16 inch diameter flanges and connections on the lower hose should not interfere with those on the upper hose while connections on both should clear the clamping points on the short links.

Calculations shows that a practical linkage design for a hose length of approximately 1,000 feet can form a span of four long links and three short links between carts occupying short links. The distance between axles of the carts is then 4 (1.585 + 3.127) = 18.85 feet. If each power cart is to tow two unpowered carts, and if the hose line is to be capable of being reversed (implying a power cart at each end of the hose), then the total length of the linkage is divided into units of 3 × 18.85 = 56.55 feet. If the total hose length is not to exceed 1,000 feet, then 17 units of linkage of 56.55 feet will be used (with 18 powered carts and 34 unpowered carts) and the total of the linkage will be 17 × 56.55 = 961.4 feet.

In order to prevent the hose flanges from interfering with one another or the clamping points requires that they occur at the midpoints of the long links. Since the midpoints of the long links are spaced at increments equal to 1.585 + 3.127 = 4.712 feet, the hose length must be in increments of this length and no greater than 50 feet. Thus, the hose length is 47.12 feet. If 21 lengths of hose are used each way, the total length of hose would be 989.5 feet, which is 28.12 feet longer than the linkage. It can thus be concluded that 38 lengths of hose 47.12 feet long plus 4 lengths of hose of the length required to make the end connections will be used.

The hose lengths over all the length of the sections, cart numbers, types, etc., are by way of example only. The above is included to give the length of the hose line and the length of each section of a particular embodiment calculated to illustrate the application of the invention to a particular situation.

Figure 13:
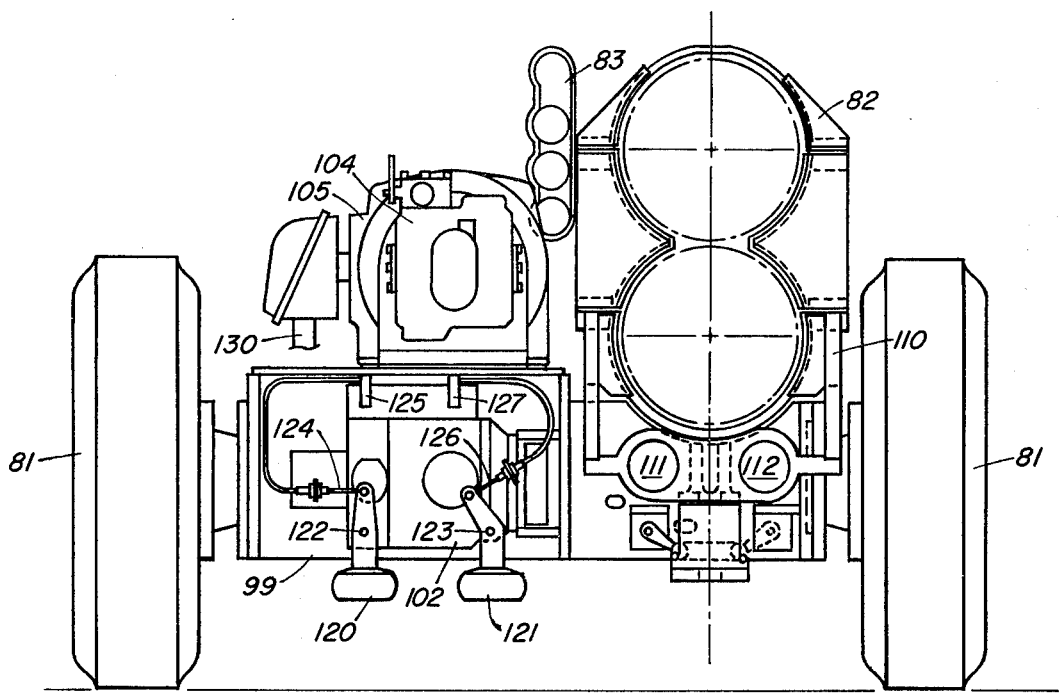
FIG. 13 is an end view of a powered cart.

A powered cart is illustrated in FIGS. 13, 14 and 15 and essentially comprises a chassis 99 and drive wheels 81, each of which is coupled to a hydraulic motor 102 through a shaft 97 as indicated in FIG. 15, although only one motor 102 is shown. A hydraulic pump 104 is driven by an electric motor 105. A control valve 106 is coupled to the hydraulic pump 104 and provides fluid control to the hydraulic motors 102. The valve 106 is capable of controlling the speed of motors 102 from a stop position to a full power position in either direction. Valve 106 is controlled by a pair of cables 107 and 108 which are coupled to the carts in front of and behind the cart illustrated, as indicated in FIG. 16. A hose mounting bracket 110 for the hose clamp 82 is attached to chassis 99 through shafts 112 which are in turn journaled in bearings 111. Shafts 112 are secured to a housing 114. Springs 113 are positioned concentrically on the shafts 112 on each side of the housing 114. The hose clamp 82 is mounted through screws 116 to the hose mounting bracket 110. Underneath chassis 99 is a pair of wheel speed control arms 120 and 121 (see FIG. 13) which are pivotally mounted at 122 and 123, respectively. A control cable 124 extends from control arm 120 to valve 125, and a control cable 126 extends from the control arm 121 to a valve 127.

The basic operation of the powered carts is as follows:

Power is applied to the electric motor 105 through a suitable electric cable 130 (FIG 13), thereby energizing the motor 105 and operating the hydraulic pump 104. The pump 104 creates a hydraulic pressure which is controlled by the valve 106. Any movement of control cables 107 and 108 will cause the arm 109 of the valve 106 to pivot forward or backward, directing flow of hydraulic fluid to the hydraulic motors 102. Each wheel 81 has its own hydraulic motor. Thus, as valve 106 is operated, the hydraulic fluid will pass to motors 102, causing them to rotate clockwise or counterwise and with a horsepower proportional to the number of degrees valve arm 109 is moved; and the direction of rotation will be dependent upon the direction of movement of arm 109 from neutral. Operation of the control arms 120 and 121 will be described below for controlling the turning of the powered cart.

Referring to FIGS. 16 and 16a, carts are shown and will be referred to as carts 80a and 80b. If, for example, it is desired to move cart 80b in the direction of arrow 128, valve arm 109 will be moved in a clockwise direction, applying hydraulic pressure simultaneously to the hydraulic motors to drive the wheels, and to cylinder 131 (in a manner to be described), which will compress the spring inside the piston and pull control rod 132. Hoses 13 and linkage 40, being rigidly connected to the carts behind cart 80b, will tend to remain in the same position. Springs 113 permit a slight movement of cart 80b, even though hoses 13 will not move. As control rod 132 conveys the "forward" signal to each cart, moving the arm 109, etc., all the carts will commence forward. The yoke 110 through linkage 133 will increase the flow through arm 109 by the amount the yoke 110 lags the neutral or center position with respect to the cart 80b. Reversal of the carts in the direction of arrow 129 will cause pressurization of cylinder 119 (in a manner to be described) for example, in cart 80b; and this information will be transferred through control cable 115 through linkage 133 to control cable 107 and to arm 109 in a similar manner as movement of the carts in the direction of 128.

Referring to FIG. 16a, linkage 133 is illustrated in detail and comprises a mounted pivot 134 attached to housing 114. A first double linkage 135 is connected to a second double linkage 137 which is anchored through pin 138 to frame 110. A linkage 139 is pivoted at 165 to the center of a double linkage 163 which is journaled in a slot 164 (one shown). Control rods 132 and 108 pivotally attached to the top and bottom of the linkage 163 operate as follows: Any movement of control rod 132 in the direction indicated is transmitted directly to control rod 108 through 1:1 linkage 163. Movement of housing 114 in the direction of arrow 129 will cause the linkage 163 to move in the same direction, causing the pivot 165 of linkage 163 in slot 164 to move to back of slot, causing additional movement of control rod 108 in the desired direction and more power to wheels of the cart. As the cart gains speed, the linkage will return to normal or centered position and reduce the torque of wheels 81. The arrangement of linkages 137 and 139 permits a long movement of housing 114 for a shortened movement of the center of linkage 163.

The actual hydraulic circuit used for the above will be disclosed in a subsequent section. The control of the powered carts, including the hydraulic pump control and electric control system described in a subsequent section under the above headings, is the subject matter of an application entitled "Vehicle and Vehicle Control System," previously identified.

UNPOWERED CARTS

An unpowered vehicle is illustrated by reference to FIG. 17 where a chassis 99 has rotatably attached thereto a pair of wheels 81. A hose mounting bracket 82 is secured to one side of chassis 99, and an electrical explosion-proof box 317 is mounted on the other side of chassis 99. Electrical cable clamps 83 are attached to hose bracket 82 or to chassis 99. A guide wheel 170 is rotatably attached to the under portion of chassis 99. The cart functions to clamp the hoses while giving them support. Guide wheel 170 assists the unpowered cart around the 180° and the 90° turns as will be described.

ELECTRIC CONTROL

Figure 20:
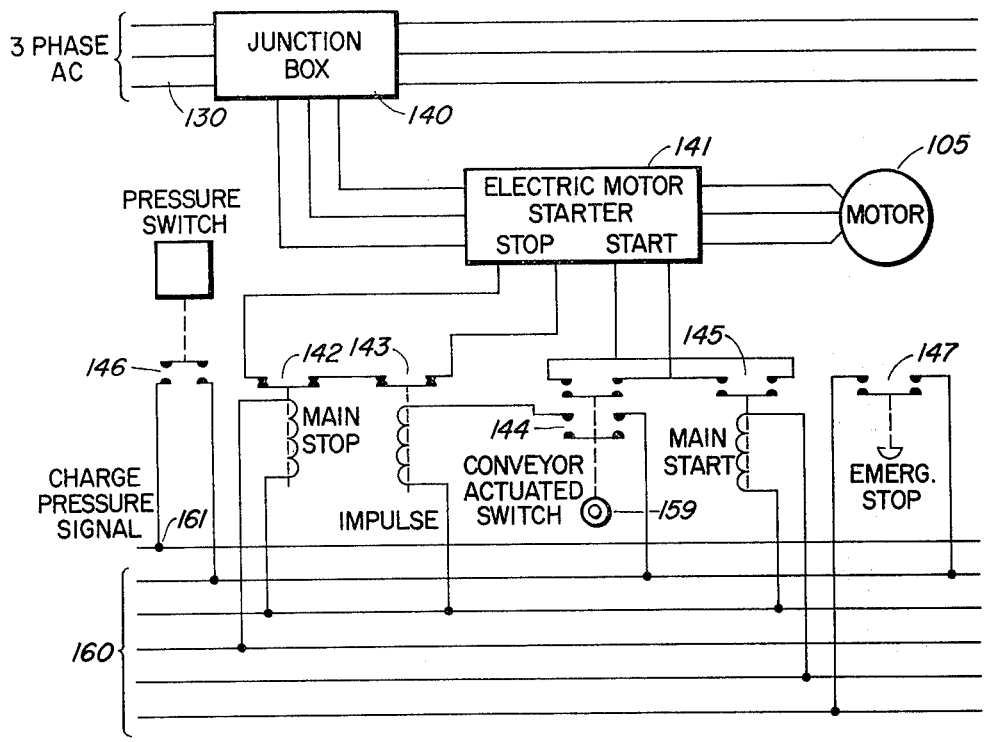
FIG. 20 is an electrical schematic for a powered cart.

The electric control for the carts is illustrated in FIG. 20. The electrical components are, in the preferred embodiments of this invention, distributed among two carts with a junction box 140, a motor starter 141, and relays 142, 143, and 145 mounted on an upowered cart in an explosion-proof box 317 as previously mentioned in connection with FIG. 17. A pressure switch 146, a conveyer switch 144, and emergency stop 147 are mounted on the powered cart 80. A three-phase a.c. line 130, which may, for example, be 575 volts, is used to operate electric motors 105 and is transmitted along the hose line in electric cables 150 (see FIG. 5).

The operation of the above is as follows:

Starter 141 is energized by closing relay 145 across its starter terminals. It is stopped by opening a set of normally closed contacts 142 across its stop terminal. A stop signal will override a conflicting start signal. Primary control of the starter 141 is by means of two relays, the normally closed relay 142 associated with the stop terminal and the normally open relay 145 across the start terminals. These relays are controlled from one or both ends of the hose lines. At this time it is presumed that the primary electric control will be from the fixed end of the hose line, but the system accommodates control from the pump vehicle end also. Actuation of a switch at the control end of the hose line will actuate all start relays 145 or all stop relays 142 simultaneously. This will start or stop all electric motors of the powered carts, except those in the storage section of the complete hose system.

Carts in the storage section are parked, and it is not desired that the electric motors on these carts be started until they pass over the traveling 180° conveyer. A limit switch 159 is mounted on each powered cart which is actuated when the cart passes over the central part of the 180° conveyer. This switch, which is normally open, has a dual set of contacts. One set of contacts is placed across the start terminal of the starter. The other set of contacts is used to control an impulse relay 143 placed in series with the main stop relay 142. An impulse relay is a mechanically latching relay whose contacts open and close on alternate actuation pulses; that is, if the impulse relay contacts are closed and the voltage is applied to its coil, the contacts open. The next time a voltage is applied to the coil, the contacts again close. Since latching is mechanical, the impulse relay stays in the condition to which it was last actuated even though all electric power is turned off. This enables a powered cart to remember which side of the 180° conveyer it is on. When the cart is on the storage side of the system and travels over the conveyer, the conveyer operated switch 159 closes the impulse relay and a start signal is applied to the starter. On coming back, the impulse relay is actuated and its contacts open, shutting off the motor.

The emergency stop switch 147, installed on all powered carts, will be a normally open switch, which when manually actuated will send a signal back to the main control station which can be used to shut down all electric power to the hauler system. The emergency stop switch could also be hooked up to shut down all electric power to the working face. With this switch in individual anywhere along the line may shut down the whole system if difficulty develops.

A pressure switch 146 will be installed on the charge pump of each hydrostatic transmission. This pressure switch, which is normally open, closes when the charge pump pressure is at the nominal value. This pressure switch transmits a voltage signal back to the main control system which can be used to light a panel lamp which will give the operator visual indication of the status of the system. He will thus have a primary indication that a cart is functional and will also have an indication of the location of the traveling 180° conveyer.

Control of the electric motors will require five lines 160 running the length of the system. An additional line 161 running the length of the system for each pressure switch will also be required.

HYDRAULIC PUMP CONTROL

Figure 21:
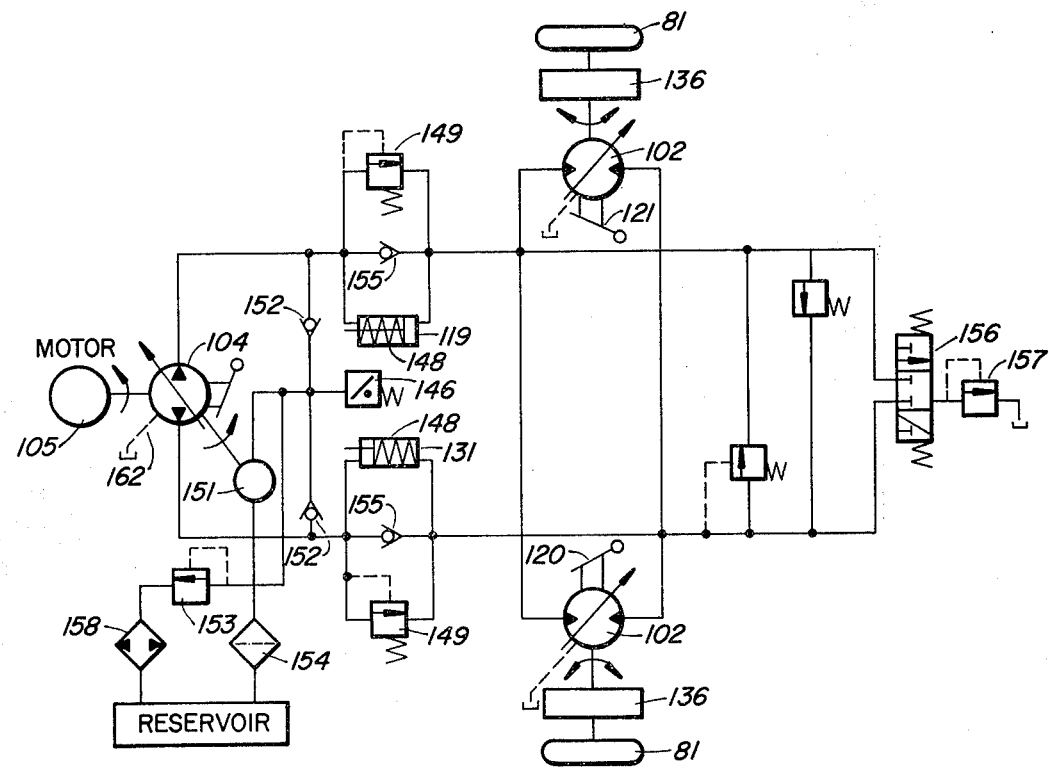
FIG. 21 is a hydraulic schematic for a powered cart.

The hydraulic pump control system is schematically illustrated in FIG. 21. The wheels 81 in the schematic are driven through a transmission 136 by the variable displacement motors 102. The hydraulic motors are supplied by the variable displacement pump 104. The pump is driven by the electric motor 105. A charge pump 151 is mounted on the same shaft with the variable displacement pump 104 and supplied the makeup flow required in the closed-loop circuit between the hydraulic motors and pump. Check valves 152 are used to isolate the charge pump output from the high pressure side of the pump-motor circuit. The relief valve 153 is used to dump the excess charge pump flow from the loop when the hydrostatic transmission is in neutral. The pressure switch 146 is used for remote monitoring of the charge pump output pressure, producing an electric signal which lights a pilot lamp at the fixed end of the hose line and gives the operator at this location an indication of those vehicles which are powered as previously mentioned. The charge pump is supplied from the reservoir through filter 154.

The cart control system requires a signal which is a measure of the hydrostatis transmission flow which is indicative of powered cart speed. This signal is obtained by either of two flow sensors 149, each of which is functionally equivalent to a relief valve with a very low setting, or a check valve. The pressure drop across a flow sensor 149 is approximately proportional to the ⅔ power of flow. The pressure drop across one flow sensor 149 is applied to control cylinder 119 and the pressure drop across the other flow sensor 149 is applied to control cylinder 131 to control the rods 115 and 132 previously referred to in connection with FIG. 16. Check valves 155 are used to permit return flow in the hydrostatic transmission loop without forcing reverse flow through sensor 149.

If flow is allowed to circulate in the hydrostatic transmission loop indefinitely, excessive heating of the oil and components will result. Hence, fresh oil must be supplied to the loop. A shuttle valve 156, actuated by the pressure differential across the hydrostatic transmission, is used to connect the motor input side of the loop to a relief valve 157. Hence, when the hydrostatic transmission is operating, excess charge pump flow is returned to the reservoir through relief valve 157. Thus fluid is continually removed from the hydrostatic transmission loop and is continually replaced by fresh fluid from the charge pump 151. Fluid is returned to the reservoir through a pump shaft mounted air-cooled oil heat exchanger 158 which removes excess heat from the system.

STEERING AND TURNING

Control of a train of vehicles which are interconnected is a complex problem, particularly when the vehicles attempt a 90° turn. U.S. Pat. No. 3,191,754 describes a method for trapping the wheel of a vehicle to insure its making a proper 90° turn. U.S. Pat. Nos. 3,301,602 and 3,397,651 both describe means for cutting trenches on the floor and incorporating means on the vehicles to engage the trenches, thereby insuring a proper turn. U.S. Pat. No. 2,722,409 discloses a cable control system for making a 90° turn. The 90° turn system as disclosed in this application operates on a principle different from that described in any system in the prior art. The particular system is described with reference to FIGS. 9, 13, 17, 18, 19a, 19b, and 19c.

Referring to FIG. 18, a 90° turn is affected by laying a guide rail 200 on the floor in the form of a 90° turn. Guide rail 200 comprises a plurality of individual members which are staked by pins 202 to the floor. Pin 203 interlocks the rail of each guide member.

Referring to FIGS. 13 and 19a through 19c, speed control arms 120 and 121 are adapted to engage guide rail 200 as shown in FIG. 19c. If, for example, arm 121 should engage guide rail 200, control rod 124 would operate valve 125 (FIG. 13) causing a reduction in hydraulic flow to the motor operating the wheel 81 on the inside of the turn and causing it to have less torque, hence slowing its speed. As a result of the above, arm 121 will move away from guide rail 200. If arm 120 should engage guide rail 200, control rod 126 would operate valve 127, causing corresponding decrease in its wheel speed. Thus the wheels 81 are increased or decreased in speed as the powered vehicles pass around the 90° turn, since the speed of a particular wheel is controlled by its corresponding control arm 121 or 120. An unpowered cart as shown in FIG. 17 has a guide roller 170 which engages guide rail 200 and is restrained by both sides of the guide rail and thereby prevented from straying from the 90° turn (See FIG. 19a). The individual short links such as 171 (see FIGS. 18 and 19b) will also be restrained by an idler wheel 170 such as that on an unpowered cart. Both the short linkage and unpowered cart are restrained in the 90° turn in the identical fashion.

FIGS. 19a through 19c illustrate the use of a double-spaced guide rail. Since the linkage is under tension at all times, a single guide rail as illustrated in FIG. 18 is all that is necessary. The double guide rail is provided as an alternative and will function equally well.

The wheel control mechanism and 90° turn methods and apparatus are the subject matter of an application entitled "Steering and Turning System," previously identified.

SLURRY HOPPER APPARATUS

Figure 22:
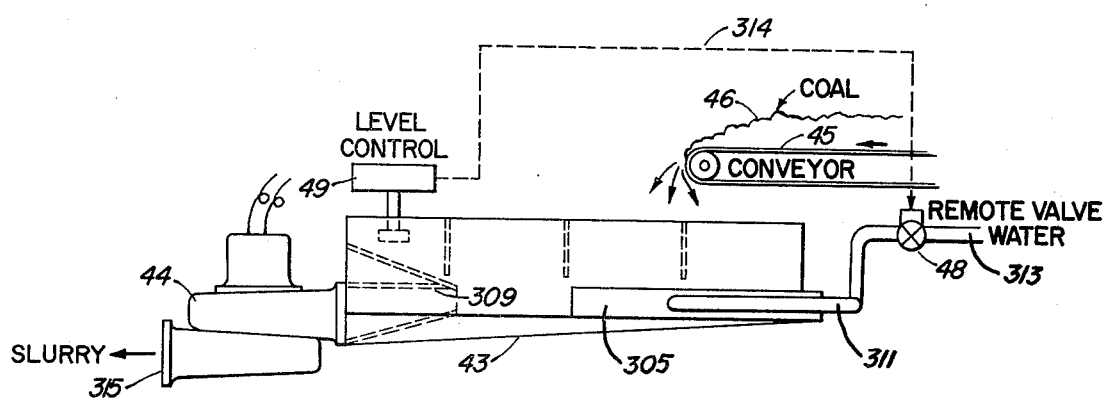
FIG. 22 is a side view of a hopper used to mix water with coal to form a slurry and also illustrates the connection of the slurry pump.
Figure 23:
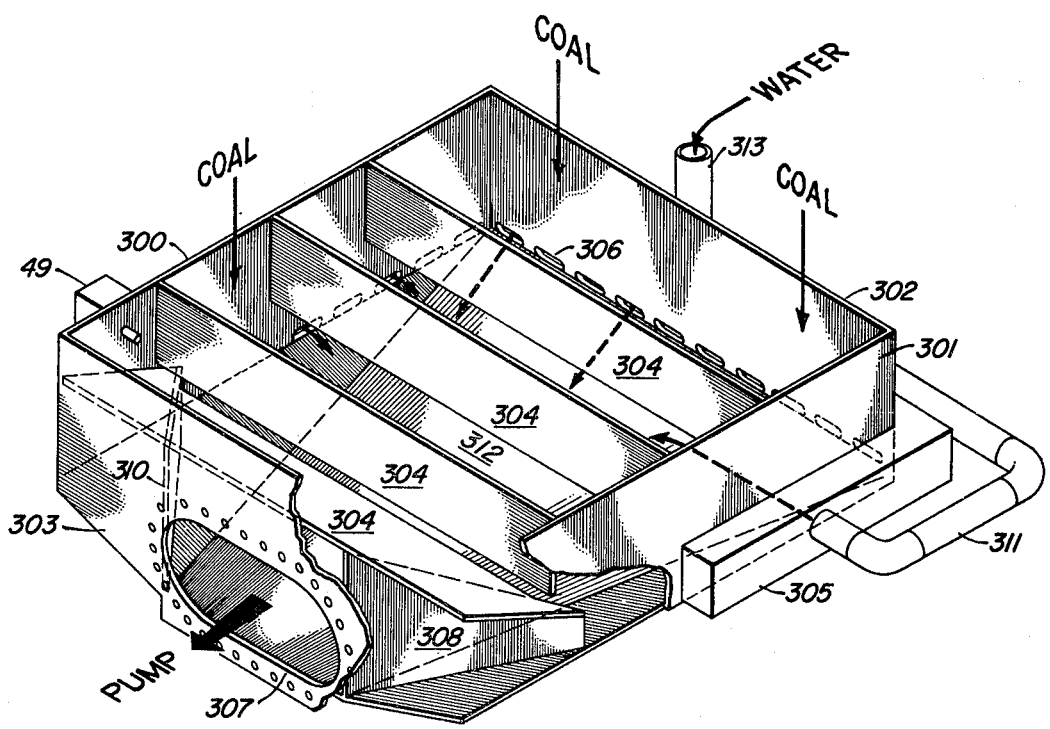
FIG. 23 is a perspective view of the hopper shown in FIG. 22.

The preferred embodiment for mixing slurry with water is illustrated in FIGS. 22 and 23 and essentially comprises a box having four side walls 300, 301, 302 and 303. A plurality of dividers 304 is spaced between walls 300 and 301. A water entry system comprises a manifold 305 which is U-shaped and mounted against walls 300, 301, and 302. A plurality of slots 306 is formed through the walls and into communication with manifold 305. The slots are also at the bottom of the walls so that the water will flow smoothly from the manifold along the bottom 312 of the hopper under the baffles 304. Side walls 300 through 303 are mounted to the bottom 312 which is tapered to form the deepest portion at a pump outlet 307. Baffles 308 and 310 form a funnel to the opening 307. A baffle 309 above opening 307 is also used to complete the funnel structure. A water entry line 313 is connected through pipes 311 to manifold 305. A water level control 49 is electrically connected to a water control valve 48 through a pair of electric wires illustrated by line 314. A conveyer system 45 (see FIG. 4) conveys coal or other product 46 into the hopper which is generally referred to as 43. A slurry pump 44 is connected at its inlet end to opening 307 and its outlet end 315 to the slurry line 13 (see FIG. 4).

In its operation the conveyer 45 conveys coal or other product over the slurry hopper, dropping it into the hopper. Water from line 13 is applied through the valve 48 through pipes 311 to manifold 305. Water from the manifold will flow out of the slots and along bottom 312 to pump opening 307. Water level control 49 continually monitors the level of the water as product is added and discharged. As water is needed, a signal through line 314 will open or close valve 48. Baffles 304 eliminate turbulence caused by the adding of the coal and the entry of the water. Water level control 49 is placed in the hopper where the water has the least turbulence. The system as described in FIGS. 22 and 23 solves several problems inherent in most hoppers. For example, circular hoppers have tended to cavitate, permitting entry of air into the slurry line where air cannot be tolerated. The hopper as disclosed in the above figures will accept coal in any amount within the design limits (from zero to ten tons per minute in a unit successfully tested) and mix the coal with water and pass it to the slurry pump without cavitation problems or water level control problems.

The slurry hopper system as herein disclosed is the subject matter of a patent application entitled "Slurry Hopper System," previously identified.

CONCLUSIONS

A complete slurry hose handling system has been described in this application along with the preferred embodiment of the system and several variations of the preferred embodiment. It is fully contemplated that other systems similar to this device can be constructed and are clearly within the teachings of this specification. For example, in lieu of the use of carts and a 180° conveyer moving along the floor of the mine, the hoses could rest on the mine floor in storage section of the slurry system and be lifted by an overhead crane type apparatus for turning through the 180° loop section and for movement along the active section of the system. Therefore, modifications and changes can be made in the system as described and are fully covered by the appended claims.

I claim:

1. In an apparatus for transporting product from a mining machine working in a mine having a floor, to a terminal having a source of water with a slurry inlet, and a source of water; first and second flexible hose means; means for interconnecting one end of said first and second flexible hose means to said slurry inlet of said terminal and to said source of water, respectively; means for mixing the product dislodged by said mining machine with said water to form a slurry and having a water inlet and a slurry outlet; means for connecting the remaining end of said first and second flexible hose means to said slurry outlet and said water inlet, respectively; means for maintaining said product mixing means in position to receive product from the mining machine; said first and second flexible hose means each having the same length, and wherein said length is greater than the distance between the terminal and the product mixing means in all but the most remote position of the mining machine with respect to the terminal, an improvement in said first and second flexible hose means comprising:

means securing said hoses in parallel realtionship along their length;

means arranging said hoses in a storage section;

means arranging said hoses in an active section substantially parallel to said storage section at least along the length of said storage section;

a 180° transition section means extending from said storage means to said active means;

means attached to and supporting the active section of said hoses off the floor of the mine for lengthwise movement upon movement of said product mixing means; and means providing a neutral, or tension force along the length of said active section.

2. Apparatus for transporting product from a mining machine working in a mine having a floor to a terminal located in the mine having a source of water, comprising:

means for incorporating the product dug by the mining machine into a water slurry;

means for maintaining said first-mentioned means in position to receive product from the mining machine;

a slurry pump on said first-mentioned means; a first flexible hose connecting the slurry pump to the terminal for conveying the slurry to the terminal;

a second flexible hose connecting the terminal to said first-mentioned means for conveying water from the terminal to said first-mentioned means;

means securing the hoses in parallel relation along their length;

each of said hoses having the same length, said length being greater than the distance between the terminal and said first-mentioned means in all but the most remote position of the mining machine with respect to the terminal, said hoses being arranged in a storage section extending from said terminal, an active section and a 180° transition section extending from said storage section to said active section, said active section extending substantially parallel to said storage section at least between said transition section and the terminal location; means supporting the active section of said hoses off the floor of the mine for lengthwise movement upon movement of the first-mentioned means; and means providing a neutral, or tension force along the length of said active section.

3. The apparatus defined in claim 2 wherein the storage sections of the hoses are parallel to at least a portion of the active sections of the hoses with a 180° bend interconnecting the active and storage sections, and characterized further to include means for supporting that portion of the hoses in the 180° bend portion off of the floor of the mine.

4. The apparatus defined in claim 2 wherein said hoses are mounted vertically in axial alignment.

5. The apparatus defined in claim 2 wherein the means for supporting the hoses includes a plurality of mobile carts adapted to travel on the floor of the mine and support the hoses at spaced points along the lengths thereof.

6. The apparatus defined in claim 5 wherein at least one of said carts has drive means thereon for driving the cart upon movement of the mining machine.

7. The apparatus defined in claim 6 wherein each cart having drive means has wheel means on each side thereof, and wherein said drive means functions to individually drive the wheel means on the opposite sides of the respective cart for controlling the turning of the respective cart.

8. The apparatus defined in claim 5 characterized further to include mobile carts supporting the storage section of the hoses.

9. The apparatus defined in claim 8 wherein a portion of said carts have drive means thereon, and means for energizing said drive means when the carts having drive means thereon are supporting the active sections of the hoses.

* * * * *